United States Patent [19]
Huber

[11] 3,874,744
[45] Apr. 1, 1975

[54] ANTISKID DEVICE FOR PRESSURE-MEDIUM OPERATED BRAKES

[75] Inventor: Johann Huber, Munich, Germany

[73] Assignee: Knorr-Bremse GmbH, Munich, Germany

[22] Filed: Nov. 9, 1973

[21] Appl. No.: 414,342

[30] Foreign Application Priority Data
Nov. 10, 1972 Germany.......................... 2254948

[52] U.S. Cl.............. 303/21 F, 303/21 A F, 303/68
[51] Int. Cl. .......................... B60t 8/02, B60t 15/02
[58] Field of Search .......... 303/21 F, 21 AF, 61–63, 303/68–69; 188/181 A

[56] References Cited
UNITED STATES PATENTS

| | | | |
|---|---|---|---|
| 3,449,019 | 6/1969 | Walker | 303/21 F |
| 3,606,489 | 9/1971 | Keller | 188/181 A |
| 3,774,976 | 11/1973 | Parsons | 303/21 F |

FOREIGN PATENTS OR APPLICATIONS

| | | | |
|---|---|---|---|
| 1,176,176 | 10/1961 | Germany | 303/21 F |

*Primary Examiner*—Trygve M. Blix
*Assistant Examiner*—Douglas C. Butler
*Attorney, Agent, or Firm*—Edmund M. Jaskiewicz

[57] ABSTRACT

An antiskid device comprises an antiskid valve which in its braking position establishes a passage between the brake control line and the brake cylinder and in its skidding position establishes a passage between the brake cylinder and a pressure relief line. A valve responsive to skidding of the vehicle connects a control chamber in the antiskid valve to a source of pressure-medium in the braking position and to a pressure relief line when skidding occurs. A noramlly open monitor valve is in the pressure relief line and this valve is closed in response to a delay exceeding that of a normal skidding action. A throttle restriction bypassing the skid responsive valve supplies pressure-medium to the control chamber so that the antiskid valve can be returned to the braking position in the event that the skid responsive valve should for any reason remain in the skidding position.

2 Claims, 1 Drawing Figure

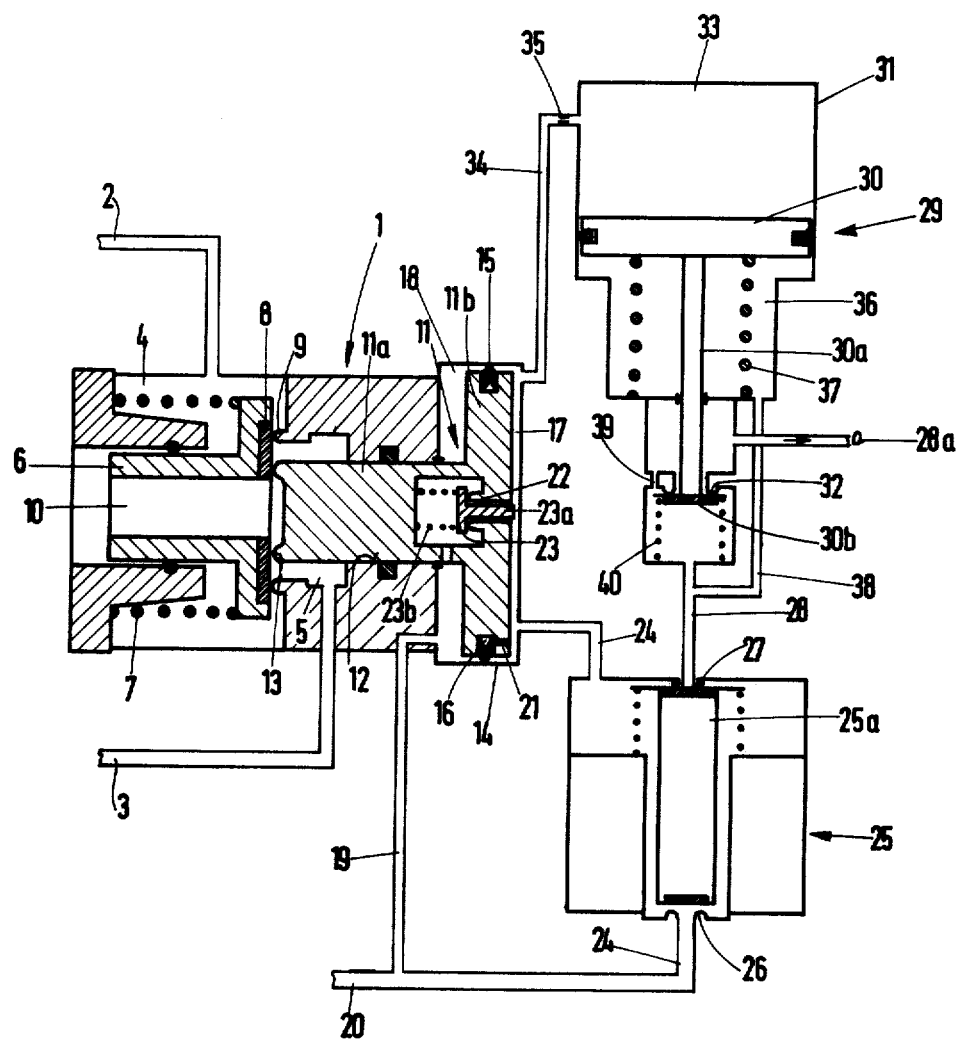

ANTISKID DEVICE FOR PRESSURE-MEDIUM OPERATED BRAKES

The present invention relates to an antiskid device for pressure-medium operated brakes in vehicles including railway vehicles, more particularly, to such a device wherein the brakes can still be operated in the event that the skid responsive valve should for any reason remain in the skid responsive position.

One form of an antiskid device which has been used particularly on railway vehicles comprises an antiskid valve which in its braking position establishes a passage between the brake control line and the brake cylinder and in its skidding position establishes a passage between the brake cylinder and a pressure relief line. The antiskid valve has a first control chamber which is connected to a source of pressure-medium in the braking position but is connected by a switching valve to a pressure relief line in the event of skidding. The switching valve is suitably electromagnetically activated in response to a skidding sensor. The passage between the brake control valve and the brake cylinder is normally established by the antiskid valve so that braking is possible at any time by the application of the pressure-medium. Should the braked wheel skid, a skidding sensor transmits a signal to the switching valve which is then actuated into its skidding position in which the passage between the brake control valve and the brake cylinder is closed and the brake cylinder is disconnected from the source of pressure. As a result, the skidding of the wheel will stop and the switching valve will again return into its original position and the antiskid valve again establishes the passage between the brake control valve and the brake cylinder so that braking is now possible.

In such antiskid devices it has been proposed to monitor electronically the operability of the skidding sensor and the components related thereto. However, the control cables leading into the switching valve and the switching valve itself are not monitored. Therefore, if the switching valve should remain stuck in the position corresponding to the skidding position of the antiskid valve or for any reason does not close the passage between the control chamber of the antiskid valve and the pressure relief line after the skidding sequence has been completed, the brake can no longer be operated.

It is therefore the principal object of the present invention to provide a novel and improved antiskid device of the type disclosed herein.

It is another object of the present invention to provide such an antiskid device which enables braking to occur in the event that the switching valve should fail.

According to one aspect of the present invention the antiskid device including the antiskid valve, and the skidding responsive switching valve as described above may be provided with a normally open monitor valve in the pressure relief line. The monitor valve is closed automatically in response to a delay exceeding that of the normal duration of a skidding occurence. While the control chamber in the antiskid valve is still free of pressure the closing of the monitor valve will supply pressure-medium to the control chamber through a throttle constriction bypassing the switching valve. The antiskid device of the present invention enables the delayed response monitor valve to close the pressure relief line after skidding stops and the skidding procedure of the device has been completed. Further, the pressure relief line will be closed even in the event that the switching valve should remain stuck in the position opening the pressure relief line or where the switching valve does not close for any other reason the passage between the first control chamber of the antiskid valve and the pressure relief line. At the same time, the present invention provides for supplying the pressure-medium to the control chamber of the antiskid valve while bypassing the switching valve so that a normal functioning of the brake will be available even in the event of failure of the switching valve after the skidding procedure.

Other objects and advantages of the present invention will be apparent upon reference to the accompanying description when taken in conjunction with the following drawing, which is exemplary, and shows schematically the several components of the antiskid device according to the present invention.

Proceeding next to the drawing a specific embodiment and modifications of the present invention will be described in detail.

In the drawing, an antiskid valve is indicated at 1 and is inserted into the passage between a brake control line 2 leading from a control valve and a supply line 3 leading to a brake cylinder. Brake line 2 ends in a collection chamber 4 while supply line 3 proceeds from an annular chamber 5. A hollow piston 6 with its front surface that contains a packing 8 is urged by a compression spring 7 to the right (as viewed in the drawing) against an annular valve seat 9 in the passage between the brake control line 2 and supply line 3. An inner chamber 10 in hollow piston 6 communicates with the atmosphere on the left-hand side according to the drawing.

Antiskid valve 1 has a differential pressure piston 11 whose small diameter section 11a slides sealed in a bore 12 that widens into the annular chamber 5 mentioned above. The front surface of the small diameter section 11a of differential pressure piston 11, which is situated on the left-hand side according to the drawing, is provided with a circular sealing strip 13 that cooperates with packing 8. A large diameter section 11b of differential pressure piston 11 is guided in a cylinder 14 and is sealed in relation thereto by a lip-type sealing ring 15. For reasons to be explained below, the sealing lips point toward the interior of a groove 16 that receives lip-type sealing ring 15.

Cylinder 14 forms a first control chamber 17 on the large surface side of differential pressure piston section 11b. A subspace 18 facing the small surface side of differential pressure piston section 11b communicates continuously through a branch line 19 with a pressure line 20 connected to a source of compressed air.

The base of groove 16 is connected to the first control chamber 17 through a small diameter tapped bore 21. The lips of lip-type sealing ring 15 thus form a kind of check valve between chamber 18 and first control chamber 17 as disclosed in the German Auslegeschrift 1 176 176 issued on Aug. 20, 1964 to the assignee of this application.

The small surface side 11a of the differential pressure piston 11 is connected with its large surface side 11b through a check valve comprising a throttled passage. It is thus possible with simple components to charge the first control chamber 17 with the pressure-medium while bypassing the switching valve. The check valve comprises the lips of the lip-type sealing ring 15 which seals the large surface side of the piston against the small surface side thereof. A small tapped bore is only necessary from the large surface side into the chamber behind the sealing lips.

Differential pressure piston 11 also contains a passage 22 having a valve member 23 which is urged into the closing position by a compression spring 23b and can be moved into the open position by the striking of an actuator rod 23a against the front wall of first control chamber 17.

This results in an even stronger flow of the pressure-medium from the small surface side to the large surface side of the differential piston. The valve 22, closed in the braking position of the antiskid valve and comprising a throttled passage from the small surface side to the large surface side, facilitates in particular a rapid switching of the antiskid valve into its braking position.

An electromagnetic solenoid switching valve 25 is inserted into a connecting line 24 between pressure line 20 and first control chamber 17. Its magnet armature 25a, constructed as valve member, cooperates in alternation with a first valve seat 26 in connecting line 24 and a second valve seat 27 in a pressure relief line 28, which leads from connecting line 24 to an outlet opening 28a to the atmosphere. Switching valve 25 is connected in known manner with a skidding sensor which transmits a signal to valve 25 when the wheel braked through supply line 3 is skidding.

A monitor valve generally indicated at 29 is inserted into the pressure relief line and is provided with a piston 30 that is slidable and sealed in a cylinder 31. Piston 30 is connected to a valve member 30b by a piston rod 30a. The valve member cooperates with a valve seat 32 in pressure relief line 28.

On the side of piston 30 away from valve member 30b, cylinder 31 forms a second control chamber 33. The second control chamber receives the pressure-medium that urges the monitor valve into the open position and communicates with the first control chamber 17 through constriction 35 in line 34. The desired delay in the closing of the monitor valve is obtained in a simple manner so that the second control chamber 33, normally supplied with pressure medium through the first control chamber 17 and the constriction 35, is emptied with delay into the pressure relief line through the constriction 35 and the first control chamber 17 when skidding occurs. The constriction 35 is so dimensioned that the pressure in the second control chamber 33 is maintained for a sufficient time to maintain the monitor valve open in the normal case up to the end of the usual duration of skidding and only then is the pressure lowered below the level effecting the closing of the monitor valve, if the pressure relief of the first control chamber persists beyond the ordinarily-occurring or usual duration of skidding.

On the side of piston 30 away from second control chamber 33, cylinder 31 forms a spring chamber 36 that contains a valve-closing spring 37 which urges piston 30 into a position wherein valve member 30b seats on valve seat 32. Spring chamber 36 is connected by a line 38 to a portion of pressure relief line 28 that is located upstream in relation to valve seat 32. Valve seat 32 is bypassed by a throttle bore 39. An auxiliary closing spring 40 also acts on valve member 30b. In the event of failure of the switching valve, the pressure building up in the spring chamber 36 assists the closing of the valve, but it opposes at the most for a short time the opening of the valve by the pressure formed in the second control chamber 33 when the switching valve is again capable of operation.

The antiskid device as described above operates in the following manner:

Under normal conditions, solenoid switching valve 25 is in the position illustrated, wherein it connects first control chamber 17 to pressure line 20 through connecting line 24 and it closes pressure relief line 28 through the abutment of magnet armature 25a against second valve seat 27. The differential pressure acting on differential pressure piston 11 moves the piston to the left according to the drawing. It thus separates hollow piston 6 with its seal 8 from valve seat 9. This opens the passage from brake control line 2 to supply line 3 and the brake cylinder can be supplied with compressed air when required. Inner chamber 10 of hollow piston 6, which communicates with the atmosphere, is sealed in relation to brake control line 2 and supply line 3, since sealing strip 13 of differential pressure piston 11 is pressed into the packing 8.

In this position, second control chamber 33 contains compressed air that arrived therein from first control chamber 17 through coupling line 34. The dimensions of monitor valve 29 are so selected that this pressure is sufficient for moving piston 30 downward against the force of valve closing spring 37, so that valve member 30b is separated from valve seat 32. Accordingly, pressure relief line 28 is open in the area of valve seat 32 but closed at valve seat 27 through magnet armature 25a of switching solenoid valve 25.

If the wheel subjected to braking should skid, the skidding sensor transmits a signal to switching solenoid valve 25, which signal induces the said valve to lift magnet armature 25a from second valve seat 27 and to press it against first valve seat 26. The first control chamber 17 is thus shut off from pressure line 20 and rapidly evacuated through the pressure relief line which is now open also at valve seat 27. The pressure maintained in partial chamber 18 moves differential pressure piston 11 of antiskid valve 1 to the right according to the drawing. In this connection the piston 11 is followed by hollow piston 6 under the effect of compression spring 7. Packing 8 of hollow piston 6 contacts valve seat 9 to close the passage between brake control line 2 and supply line 3. The hollow piston 6 is now no longer able to follow the further movement of differential pressure piston 11 to the right, so that sealing strip 13 becomes separated from packing 8. This opens the passage from annular chamber 5 to inner chamber 10 of hollow piston 6 and to the atmosphere. The brake cylinder is thus vented and the brake effect stopped, so that skidding can no longer take place.

A suitable signal of the skidding sensor then brings switching solenoid valve 25 back into its original position, so that first control chamber 17 is again charged and antiskid valve 1 is moved from the skidding position described above back into the braking position.

If after the completion of the skidding procedure solenoid switching valve 25 remains for any reason stuck in the position wherein magnet armature 25a contacts first valve seat 26, or if switching solenoid valve 25 is no longer able to close the pressure relief line in the area of valve seat 27 even after skidding stops, for any reason, e.g., because of icing or penetration of foreign bodies, the following takes place:

As pressure relief line 28 is released through switching solenoid valve 25 and while monitor valve 29 is still open, the compressed air in second control chamber 33 begins to escape through coupling line 34 into first control chamber 17. The flow is delayed by constriction 35, and when the pressure in second control chamber 33 drops below a certain level, valve-closing spring 37 moves piston 30 into the position wherein valve member 30b contacts valve seat 32 and closes pressure relief line 28. Constriction 35 is so dimensioned that monitor valve 29 is closed only then when a skidding procedure of normal duration is completed, so that normally, i.e., without a failure, switching solenoid valve 25 would have already switched back into its starting position.

At the instant when pressure relief line 28 is closed by monitor valve 29, pressure is built up again in first control chamber 17. On the one hand, this is due to the fact that the valve formed by lip-type sealing ring 15 in connection with bore 21 allows the compressed air to pass from partial chamber 18 of cylinder 14 into first control chamber 17. On the other hand, in the skidding position of antiskid valve 1 actuator rod 23a contacts the front wall of cylinder 14 which is on the right hand side according to the drawing, so that through valve 22 is opened and likewise permits the passage of compressed air from partial chamber 18 into first control chamber 17.

The pressure building up in first control chamber 17 moves differential pressure piston 11 to the left according to the drawing, so that brake control line 2 and supply line 3 are again connected and normal braking can be performed in spite of the failure of switching solenoid valve 25.

Through coupling line 34 and constriction 35 the pressure is gradually built up also in second control chamber 33. However, this does not bring about the opening of monitor valve 29, since a corresponding pressure is built up also in spring chamber 36 through the first portion of pressure release line 28 and line 38, which corresponding pressure together with valve-closing spring 37 holds monitor valve 29 closed. Accordingly, merely the antiskid device has failed here; but it is possible to brake if one accepts the risk of possible skidding.

If the failure of switching solenoid valve 25 is temporary, magnet armature 25a contacts again valve seat 27 during normal travel and brake operation, thus shutting pressure relief line 28 from first control chamber 17. The pressure in spring chamber 36 can then be gradually reduced through throttle bore 39 until the pressure in second control chamber 33 becomes stronger and moves piston 30 against the force of valve-closing spring 37 into the open position of monitor valve 29. The starting position is then again obtained.

The invention is not restricted to the exemplified embodiment illustrated. In particular, the described antiskid device can be employed also with pressure media other than compressed air, especially hydraulic pressure media and in particular in motor vehicle brakes. In regard to the function of monitor valve 29, the connection to the first control chamber 17 is not of decisive importance. The essence consists in the provision of means which, on occurence of skidding, close the monitoring valve with such a delay that it interrupts the flow of the pressure-medium from the chamber controlling the movement of the antiskid valve into the skidding position after the normal duration of skidding is exceeded. The delayed closing movement of the monitor valve could also be controlled, for example, by a mechanical retardation system or by an electrical delay device. Further, first control chamber 17 need not absolutely necessarily be charged through the valves arranged in the differential pressure piston when monitor valve 29 is closed. A direct introduction of pressure-medium into first control chamber 17 through a suitable throttle could also be provided for this purpose.

It will be understood that this invention is susceptible to modification in order to adapt it to different usages and conditions, and accordingly, it is desired to comprehend such modifications within this invention as may fall within the scope of the appended claims.

What is claimed is:

1. In an antiskid device for pressure-medium operating brakes in a vehicle, the combination of an antiskid valve connected between a brake control line and a brake cylinder line and having a braking position and a skidding position, said antiskid valve having a first chamber and connected to a pressure relief line, means in said antiskid valve for establishing a passage therein between said brake control and brake cylinder lines in the braking position and for establishing a passage between said brake cylinder line and the atmosphere in the skidding position, said antiskid valve has a differential pressure piston the larger surface of which is directed toward said first chamber and the smaller surface area being continuously connected to a source of pressure-medium, a check valve defining a throttle passage in said piston connecting the smaller surface to said larger surface thereof, valve means responsive to skidding for connecting said first chamber to said pressure relief line when skidding occurs and having means for connecting said first chamber to a source of pressure-medium in the braking position, a normally open monitor valve connected in said pressure relief line, means for closing said monitor valve in response to a delay in the return of the antiskid valve to the braking position exceeding that of a skidding action, and means including a throttle restriction bypassing said skid responsive valve means for supplying pressure-medium to said first chamber so that the antiskid valve is returned to the braking position when the skid responsive valve means continues to connect the antiskid valve first control chamber to the pressure relief line for a time in excess of a skidding action, said monitor valve has a second chamber connected to said first chamber through said throttle restriction, said monitor valve comprises a cylinder having a moveable piston therein defining a second chamber on its larger surface and a spring chamber on its smaller surface, a spring within said spring chamber acting upon said piston to close the monitor valve, a valve member in said pressure relief line connected to said piston to open and close said line, means connecting said spring chamber to said pressure relief line upstream of said valve member, and a throttle passage bypassing said valve member.

2. In an antiskid device as claimed in claim 1 wherein said antiskid valve has a differential pressure piston the larger surface of which is directed toward said first chamber and the smaller surface area is continuously connected to a source of pressure-medium, a passage in said piston between said smaller and larger surfaces and having a valve therein closed in the braking position of the antiskid valve, said passage constituting a throttle passage from said smaller surface to said larger surface, and rod actuator means for opening said valve when the antiskid valve is in the skidding position.

* * * * *